(12) United States Patent
Toutonghi

(10) Patent No.: US 7,779,130 B1
(45) Date of Patent: Aug. 17, 2010

(54) METHOD AND APPARATUS TO TRANSFER A NEW DATA OBJECT FROM A DATA ACQUISITION DEVICE TO A USER STORAGE DEVICE

(75) Inventor: Michael Joseph Toutonghi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1374 days.

(21) Appl. No.: 10/817,599

(22) Filed: Apr. 2, 2004

(51) Int. Cl.
*G06F 15/16* (2006.01)
(52) U.S. Cl. .................................................. 709/227
(58) Field of Classification Search ................ None
See application file for complete search history.

(56) References Cited

U.S. PATENT DOCUMENTS

| | | | | |
|---|---|---|---|---|
| 5,564,109 A | * | 10/1996 | Snyder et al. .................. 710/8 |
| 5,838,916 A | * | 11/1998 | Domenikos et al. ......... 709/219 |
| 5,848,234 A | * | 12/1998 | Chernick et al. ............. 709/203 |
| 6,928,476 B2 | * | 8/2005 | Bucher ....................... 709/225 |
| 6,956,833 B1 | * | 10/2005 | Yukie et al. .................. 370/328 |
| 7,197,711 B1 | * | 3/2007 | Crosbie et al. ............... 715/732 |
| 2003/0009586 A1 | * | 1/2003 | Harrow et al. ............... 709/238 |
| 2005/0075895 A1 | * | 4/2005 | Mohsenin et al. .............. 705/1 |

\* cited by examiner

*Primary Examiner*—Hussein Elchanti
*Assistant Examiner*—Clayton R Williams
(74) *Attorney, Agent, or Firm*—Workman Nydegger

(57) ABSTRACT

In one embodiment, the invention provides a method for a data acquisition device to transfer a new data object to a user storage device. The method comprises detecting a new data object; determining an availability of one or more user storage devices to store the new data object in response to the detecting; establishing a communications session with at least one available user storage device; and sending the new data object to the at least one available user storage device for storage therein.

16 Claims, 10 Drawing Sheets

Operations performed by the online connection service to initiate a session between a DAD and a user storage device

METHOD AND APPARATUS TO TRANSFER A NEW DATA OBJECT FROM A DATA ACQUISITION DEVICE TO A USER STORAGE DEVICE

FIELD OF THE INVENTION

Embodiments of the invention relate to data storage in general, and in particular to the storage of newly acquired data representing, for example, a digital photograph, a voice memo, etc.

BACKGROUND

As used herein, the term "data acquisition device (DAD)," refers to a device that generates a digital data object to represent information. For example, the information may comprise a photograph, a voice memo, a video, etc. Examples of DADs include a mobile telephone enabled with a camera, a personal digital assistant (PDA) enabled with a voice recorder, etc.

Although each DAD has an internal memory to store a digital data object, because of constraints on a size of the internal memory, a user typically would transfer the digital data object to another user storage device. As used herein, the term "user storage device" refers to any device of a user that can be used to store a data object acquired by a DAD. An example of a user storage device includes a personal desktop computer, a notebook computer, etc.

The process of transferring a digital data object from a DAD to a user storage device is limiting in that it requires device-to-device registration, multiple explicit user steps, and usually requires that the DAD be in close physical proximity to the receiving user storage device.

SUMMARY OF THE INVENTION

In one embodiment, the invention provides a method for a data acquisition device to transfer a new data object to a user storage device. The method comprises detecting a new data object; determining an availability of one or more user storage devices to store the new data object in response to the detecting; establishing a communications session with at least one available user storage device; and sending the new data object to the at least one available user storage device for storage therein.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, the invention provides a method for a data acquisition device such as a camera-enabled mobile telephone, to transfer a new data object, for example, a new image captured by the camera-enabled mobile telephone to a user storage device such as a user's personal desktop computer. Broadly, the method illustrated in FIG. 2 of the drawings, wherein at block 200 the data acquisition device detects a new data object, at block 202 the data acquisition device determines an availability of one or more user devices to store the new data object in response to the detecting; at block 204, the data acquisition device establishes a communications session with at least one available user device; and at block 208, the data acquisition device sends the new data object to the at least one available user device for storage therein.

Figure 1:
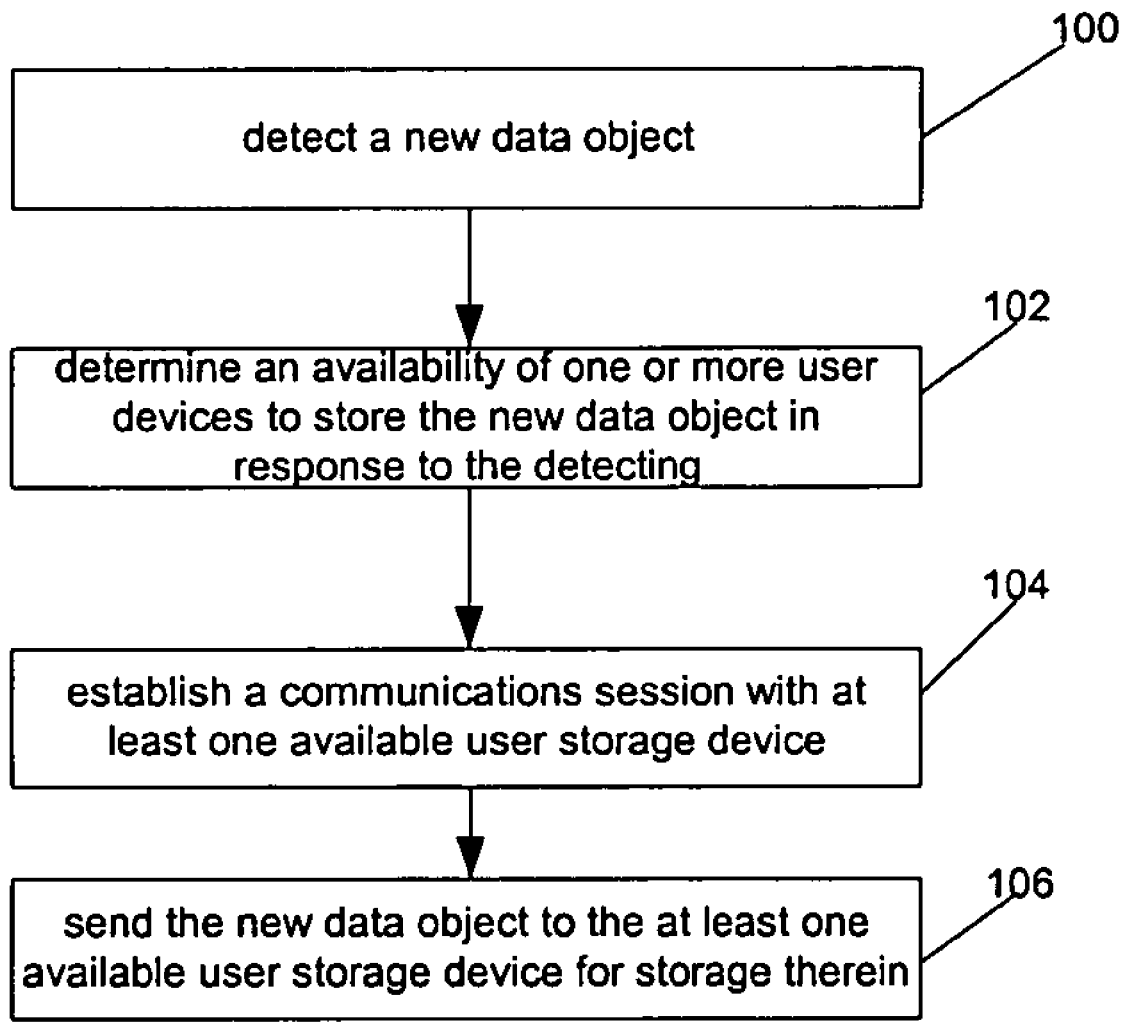
FIGS. 1 and 3 show a flowchart of operations performed by a data acquisition device in accordance with one embodiment of the invention.
Figure 2:
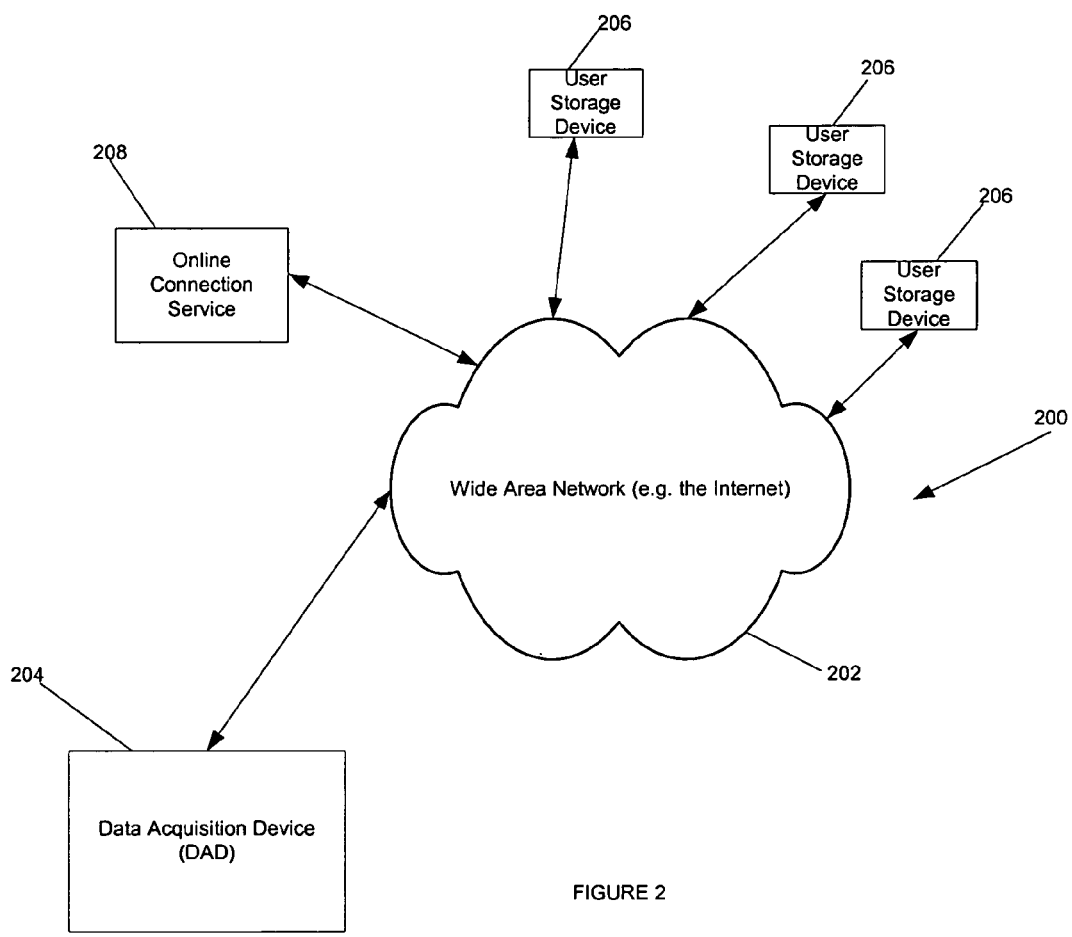
FIG. 2 shows a high-level block diagram of a network architecture within which embodiments of the present invention may be practiced.

Referring now to FIG. 2 of the drawings, reference numeral 200 generally indicates a network environment within which embodiments of the present invention may be practiced. As will be seen, the network environment includes a wide-area network 202 which may, for example, comprise the Internet. A data acquisition device (DAD) 204 is coupled to the wide-area network 202 using, for example, the transmission control protocol over the Internet protocol (TCP/IP). In one embodiment, the data acquisition device 204 captures or acquires a new data object which may, for example, be a new picture, or a voice memo, and transfers the new data object to a user storage device 206 using an online connection service 208. The user storage devices 206 represent any device associated with the data acquisition device 204, and which has a storage capacity to store a new data object captured or acquired by the data acquisition device 204. For example, a user storage device 206 may comprise a user's personal desktop computer, a user's personal notebook computer, or a user-specific storage on a shared device that is made available for use as a storage service, etc. The online connection service 208 may be a service running on a network server. The hardware necessary to implement the data acquisition device 204, the online connection service 208, or any of the user storage devices 206 is described with reference to FIG. 9 of the drawings below. Communications between the online connection service 208 and each of the user storage devices 206 to the wide-area network 202 may be supported by the transmission control protocol over the Internet protocol (TCP/IP).

Figure 3:
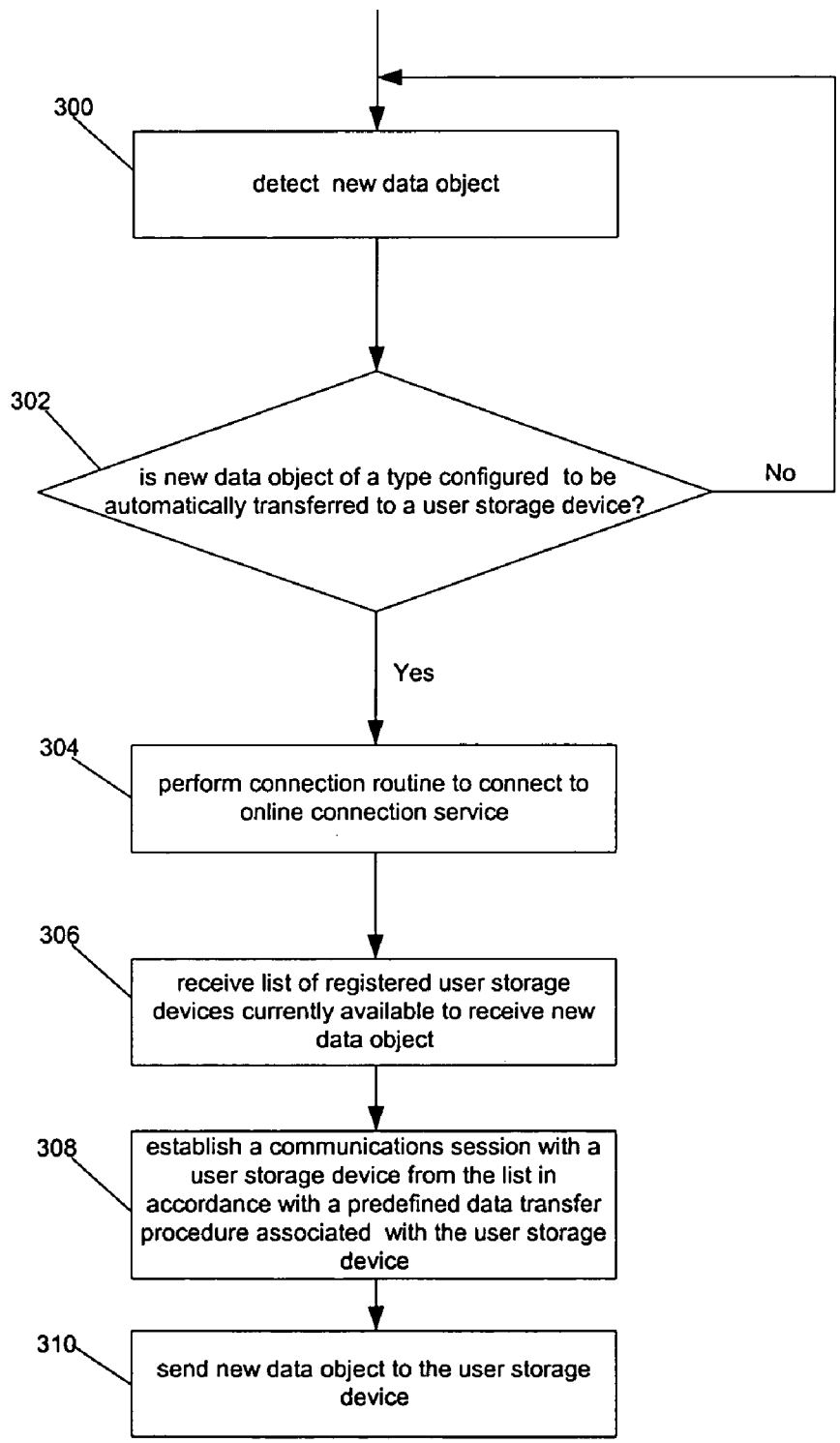

Referring now to FIG. 3 of the drawings, there is shown a flowchart of operations performed by the DAD 204 in accordance with one embodiment of the invention. Referring to FIG. 3 at block 300, the DAD 204 detects a new data object representing, for example, a newly captured picture, or a voice memo. At block 302, the DAD 204 checks if the new data object is of a type configured to be automatically transferred to a user storage device 206. In one embodiment, the DAD 204 may include a configuration file which specifies which data object types are to be automatically transferred. The information in the configuration file may be input by a user. For example, the user may input configuration information to indicate that all voice data objects are not to be automatically transferred, whereas all image or picture data objects are to be automatically transferred.

At block 304, the DAD 204 performs operations of a connection routine to connect to the online connection service 208. The specific operations that comprise the connection routine, in accordance with one embodiment, are shown in FIG. 3 of the drawings. Once the connection routine is performed, at block 306, the DAD 204 receives a list of registered user storage devices 206 currently available to receive the new data object. In one embodiment, the list of registered user storage devices may be prioritized, for example, so that registered user storage devices appearing higher on the list are preferred devices for storing the new data object. At block 308, the DAD 204 establishes a communications session with a user storage device 206 from the list. The communication session is in accordance with a predefined data transfer procedure associated with the user storage device 206. For example, the data transfer procedure may include the operations illustrated in FIG. 4 of the drawings, as will be described in greater detail below. At block 310, the DAD 204 sends the new data object to the user storage device 206.

Figure 4:
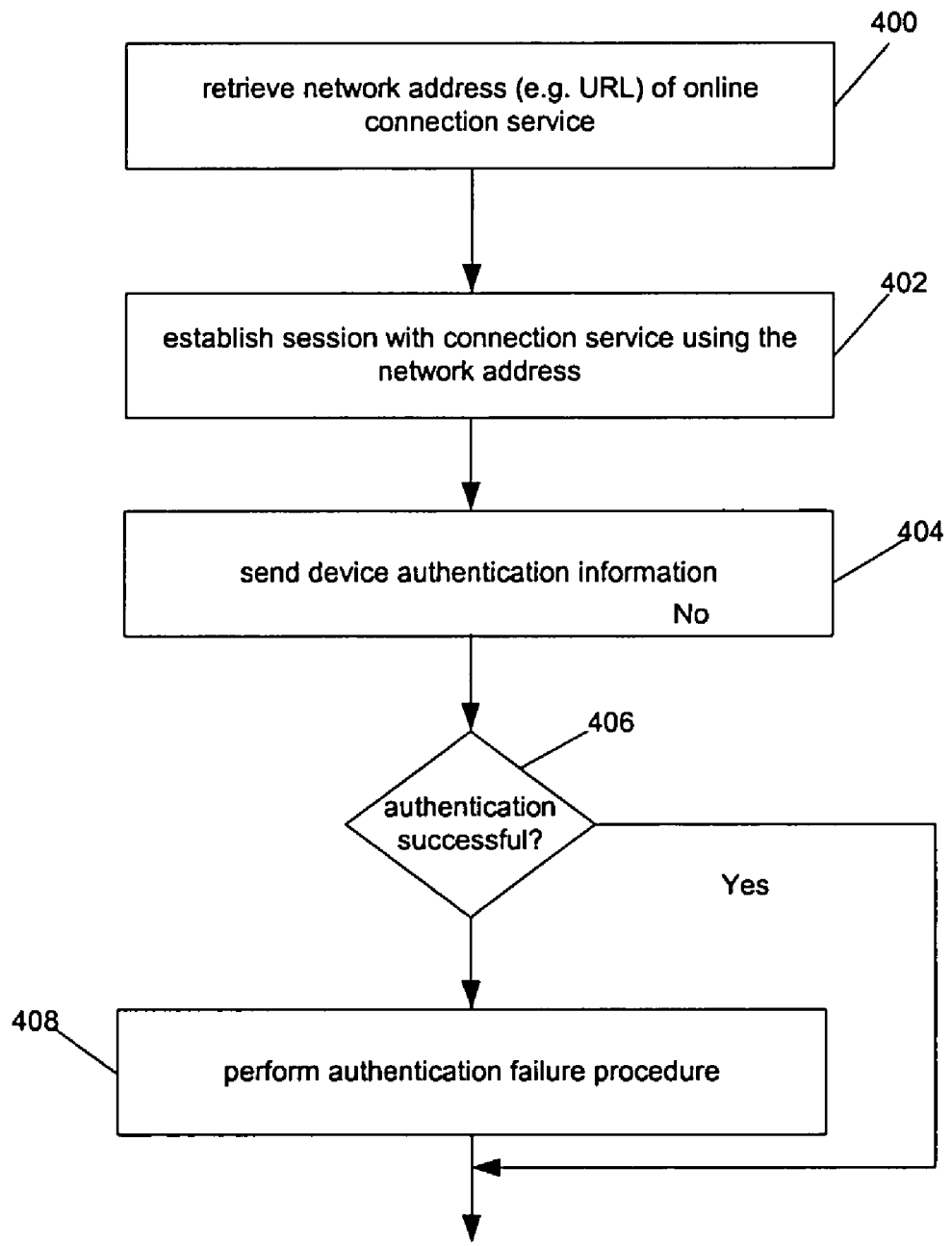
FIG. 4 shows a flowchart of a connection routine to connect to an online connection service, in accordance with one embodiment of the invention.

Referring now to FIG. 4 of the drawings, there is shown a flowchart of operations that comprise the connection routine used to connect to the online connection service 208, in accordance with one embodiment of the invention. At block 400, the DAD 204 retrieves the network address, for example, the Uniform Resource Locator (URL) of the online connection service 208. The network address is retrieved from a memory of the DAD 204. At block 402, the DAD 204 establishes a communications session with the online connection service 208 using the retrieved network address. At block 404, the DAD 204 sends device authentication information to authenticate itself to the online connection service 204. At block 406, if authentication of the DAD 204 to the online connection service 208 is unsuccessful, then control passes to block 408 wherein an authentication failure procedure is executed. For example, in one embodiment, the authentication failure procedure may include sending a notification to a user of the DAD 204 to inform or notify the user of the authentication failure.

Figure 5A:
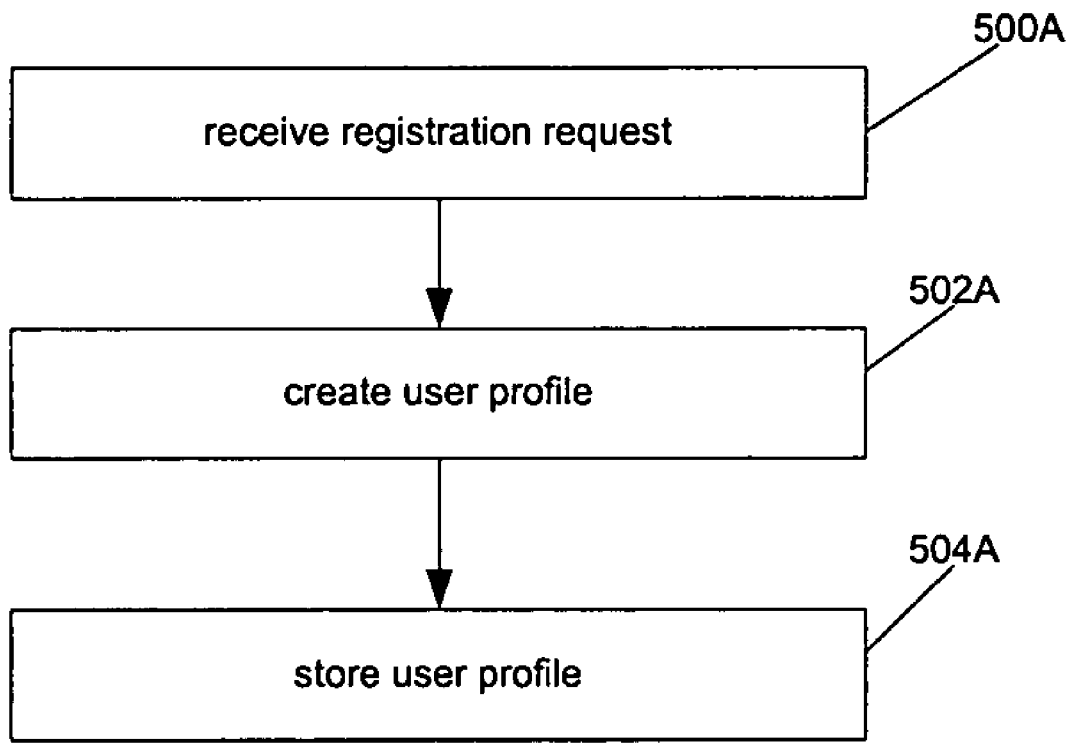
FIG. 5A shows a flowchart of a user registration procedure performed by the online connection service, in accordance with one embodiment of the invention.

FIG. 5A of the drawings illustrates the operations of a user registration procedure performed by the online connection service 208, in accordance with one embodiment of the invention. Starting at block 500A, the online connection service 208 receives a user registration request from the DAD 204. At block 502A, the online connection service 208 creates a user profile using the information contained in the registration request. In one embodiment, the user profile includes a user identifier (ID), and a password for the user in addition to one or more user storage devices 206 associated with the user. At block 504A, the online connection service 208 stores the user profile in memory. After a user is registered, the user can register multiple devices to be associated with his/her user profile.

Figure 5B:
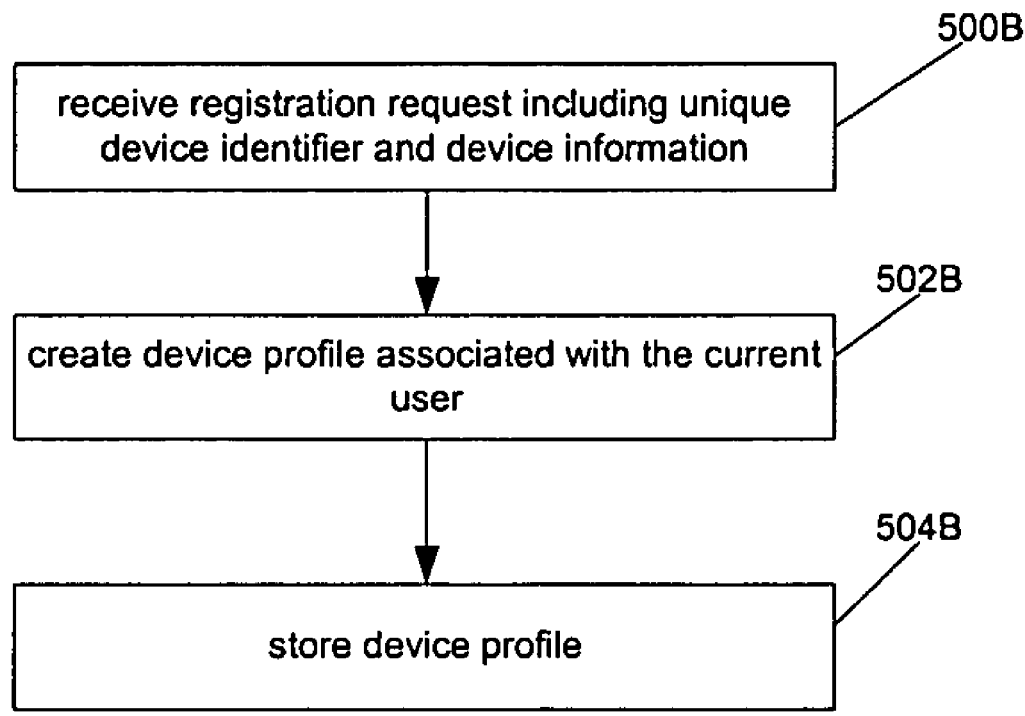
FIG. 5B shows a device registration procedure performed by the online connection service, in accordance with one embodiment of the invention.

FIG. 5B of the drawings illustrates the operations of a device registration procedure performed by the online connection service 208, in accordance with one embodiment of the invention. The operations shown in FIG. 5B are performed after a registered user has logged in the online connection service 208. Referring to FIG. 5B, at block 500B the online connection service 208 receives a device registration request from the DAD 204. The registration request includes a unique device identifier (id), and device information characterizing the DAD 204. For example the device information may comprise a device type, communications protocols supported by the device, etc. At block 502B, the online connection service 208 creates a device profile based on the unique device id and the device information for the current user. At block 504B, the online connection service stores the device profile in memory.

Figure 6:
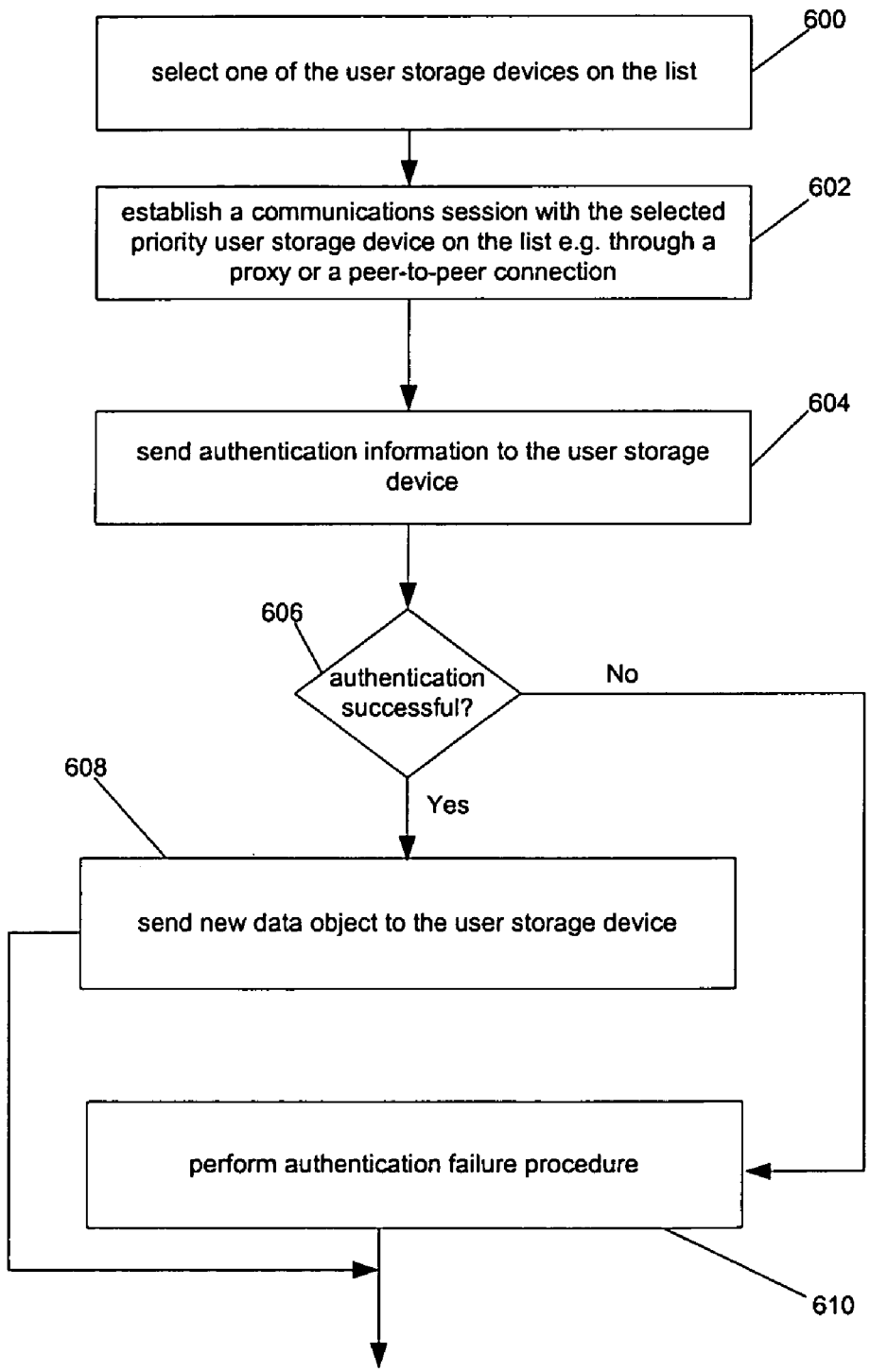
FIG. 6 shows a flowchart of a data transfer procedure in accordance with one embodiment of the invention.

Referring now to FIG. 6 of the drawings, there is shown a flowchart of the operations of a data transfer procedure performed by the DAD 204, in accordance with one embodiment of the invention. Starting at block 600, the DAD 204 selects one of the user storage devices 206 from the list. The selection of the user storage device is based on a selection process which according to some embodiments may be based on the connection route to the user storage device, e.g., a direct, point-to-point route, or an indirect route that uses an intermediate proxy server, the storage capacity available on the user storage device, etc. For example, the selection process may select a user storage device that supports a direct connection route, all things being equal. At block 602, the DAD 204 establishes a communication session with the selected user storage device 206 in accordance with the connection method supported by this device 206. At block 604, the DAD 204 sends authentication information to authenticate itself to the selected user storage device. If at block 604 it is determined that the authentication is successful, then control passes to block 608, wherein the DAD 204 sends the new data object to the user storage device for storage therein. Alternatively, if at block 606, the DAD 204 determines that authentication was unsuccessful, then block 610 executes, wherein the DAD 204 performs an authentication failure procedure which may, for example, include sending a notification to a user of the DAD 204 to inform the user of the authentication failure.

Figure 7:
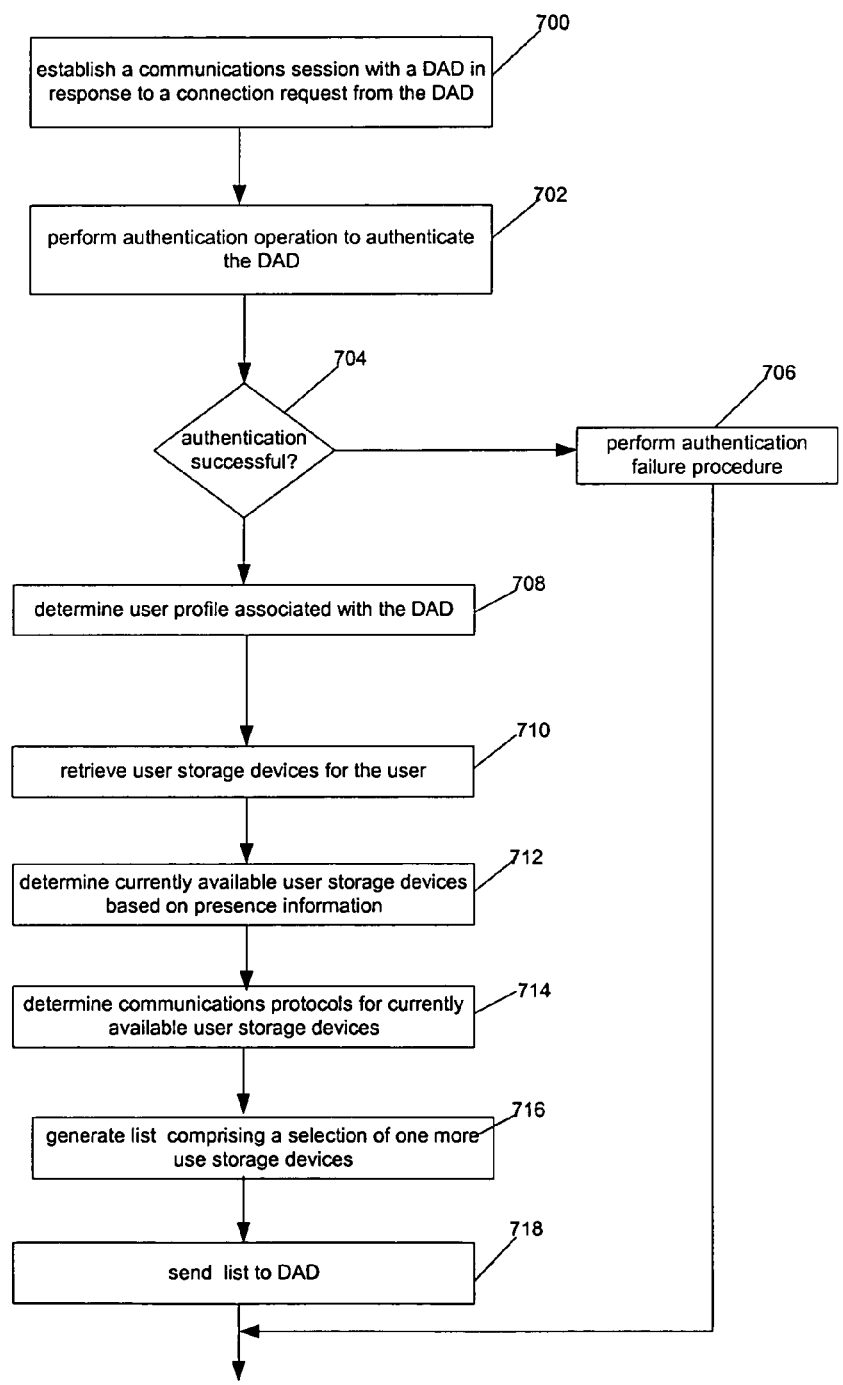
FIG. 7 shows the operations performed by the online connection service to initiate a session between a data acquisition device and a user storage device, in accordance with one embodiment of the invention.

Referring now to FIG. 7 of the drawings, there is shown a flowchart of operations performed by the online connection service 206, in accordance with one embodiment, to initiate a session between a DAD 204, and a user storage device 206. At block 700, the online connection service 208 establishes a connection session with the DAD 204 in response to a connection request received from the DAD 204. At block 702, the online connection service 208 performs an authentication operation to authenticate the DAD 204. If at block 704, the authentication of the DAD 204 was unsuccessful, then control passes to block 706, wherein an authentication failure procedure is performed. For example, in one embodiment, the authentication failure procedure may include sending a notification to the DAD 204 to inform a user of the DAD 204 that authentication of the DAD 204 to the online connection service 208 has failed. If the authentication of the DAD 204 was successful, then control passes to block 708, wherein the online connection service 208 retrieves a user profile associated with the DAD 204. At block 710, the online connection service 204 retrieves the user storage devices for the user. At block 712, the online connection service 208 determines which of the user storage devices associated with the user profile are currently available, based on presence information. At block 714, the online connection service 208 determines the communications protocols for the currently available user storage devices. For example, the communications protocol may specify whether a user storage device 206 supports the Hypertext Transfer Protocol (HTTP) or a modified form of HTTP, whether a direct point-to-point link may be established with the user storage device, or whether an intermediate proxy server has to be used.

At block 716, the online connection service 208 generates a list which includes a selection of the currently available user storage devices, and the communications protocols supported by each of the user storage devices 206 on the list. For example, in one embodiment the list may comprise the URL of each currently available user storage device, as well as the communications protocol supported by each of the currently available user storage devices. Selection of the currently available user storage devices may be in accordance with the selection procedure described above with reference to FIG. 6. At block 718, the online connection service 208 sends the list to the DAD 204. In one embodiment, the list may be a prioritized list, prioritized based on criteria including, for example, the available storage space on a user storage device, the proximity of the user storage device to the DAD 204, etc.

Figure 8:
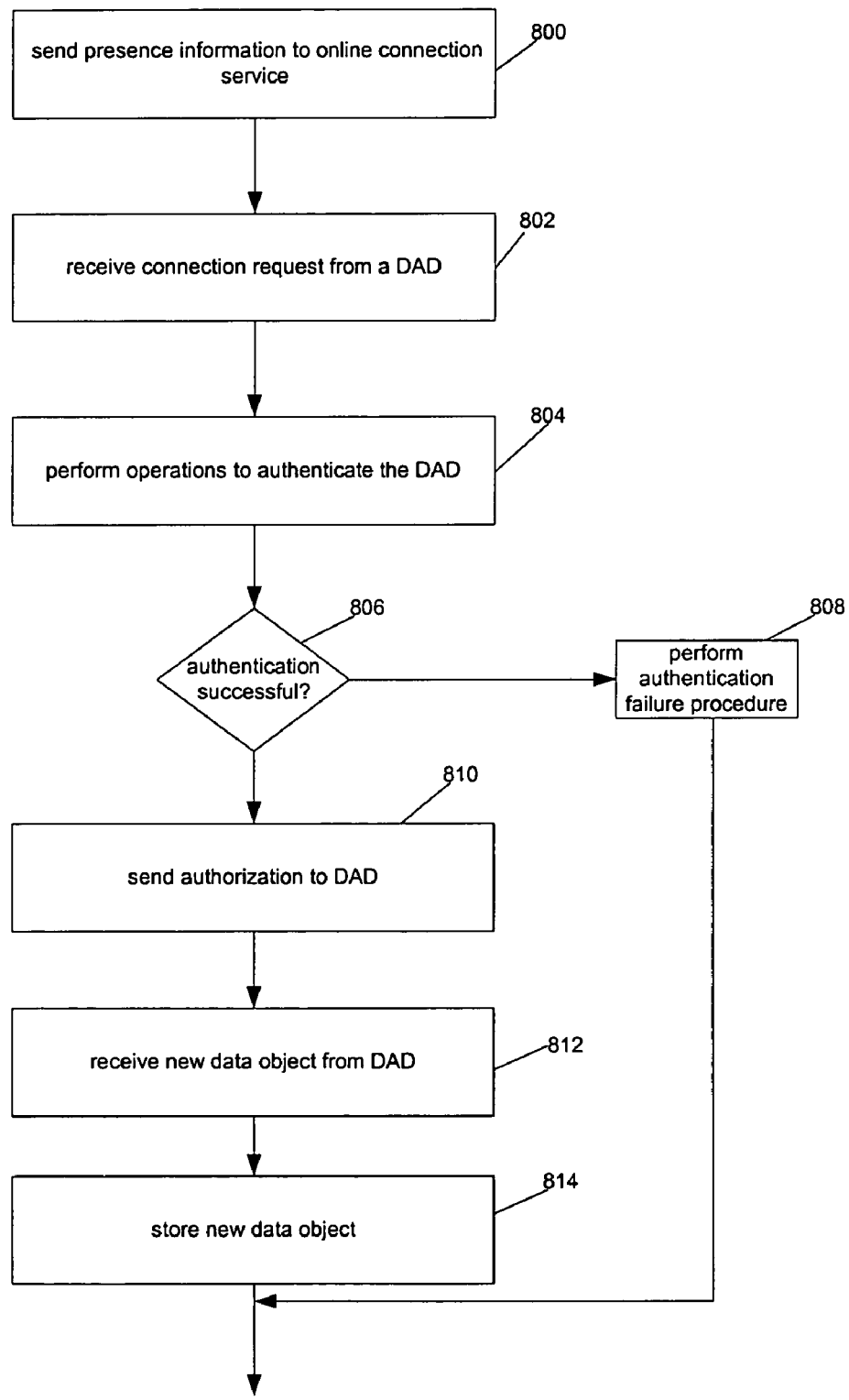
FIG. 8 shows a flowchart of the operations performed by a user storage device, in accordance with one embodiment of the invention.

Referring now to FIG. 8 of the drawings, there is shown a flowchart of operations performed by a user storage device 206, in accordance with one embodiment of the invention. At block 800, the user storage device 206 sends presence information to the online connection service 208. The presence information indicates whether the user storage device 206 is currently available or not. For example, in one embodiment, operations performed at block 800 may include using instant messaging (IM) technology to register the presence of devices.

At block 802, the user storage device 206 receives a connection request from a DAD 204. At block 804, the user storage device 206 performs operations to authenticate the DAD 204. If, at block 806, the authentication of the DAD 204 is unsuccessful then control passes to block 808, wherein an authentication failure procedure is executed. The authentication failure procedure may include, for example, sending a notification to the DAD 204 to indicate the authentication failure. If, however, authentication is successful, then control passes to block 810, wherein the user storage device 206 sends an authorization to the DAD 204, which basically authorizes the DAD 204 to send the new data object to the user storage device 206, for storage therein. In response, at block 812, the user storage device 206 receives the new data object from the DAD 204. At block 814, the new data object is stored in memory.

Figure 9:
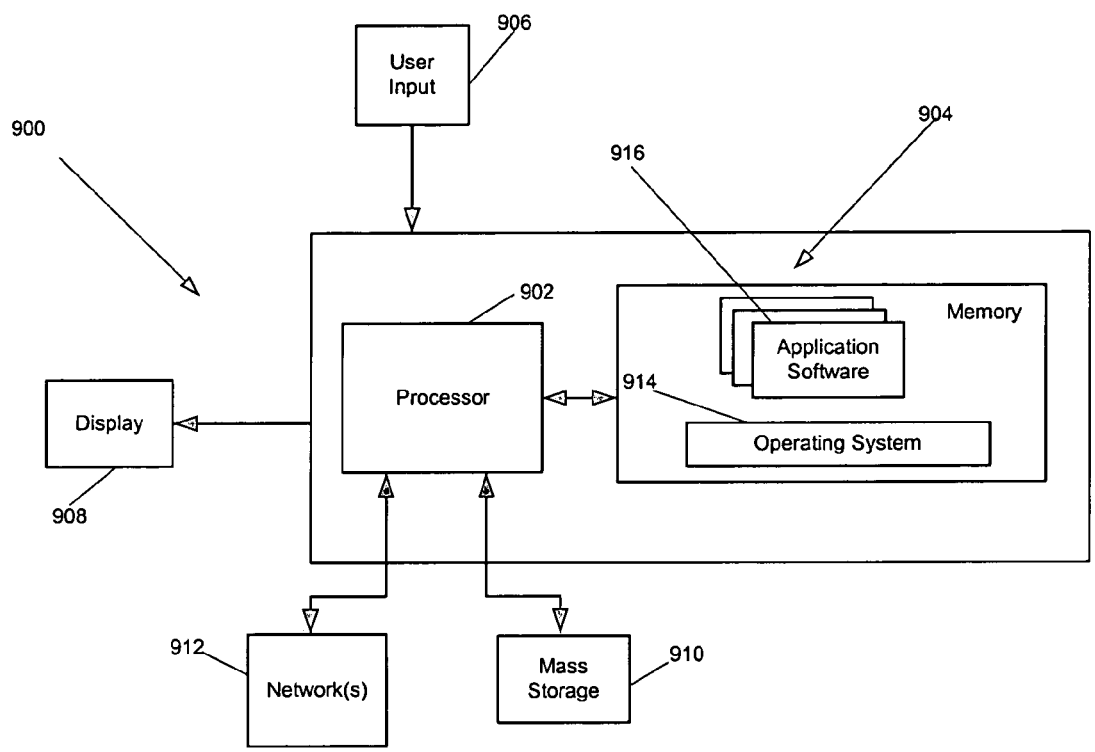
FIG. 9 shows a high-level block diagram of hardware that may be used to implement any one of a data acquisition device, an online connection service, and a user storage device, in accordance with one embodiment of the invention.

Referring to FIG. 9 of the drawings, reference numeral 900 generally indicates hardware that may be used to implement any of the DAD 204, a server that runs the online connection device 208, and a user storage device 206 in accordance with one embodiment. The hardware 900 typically includes at least one processor 902 coupled to a memory 904. The processor 902 may represent one or more processors (e.g., microprocessors), and the memory 904 may represent random access memory (RAM) devices comprising a main storage of the hardware 900, as well as any supplemental levels of memory e.g., cache memories, non-volatile or back-up memories (e.g. programmable or flash memories), read-only memories, etc. In addition, the memory 904 may be considered to include memory storage physically located elsewhere in the hardware 900, e.g. any cache memory in the processor 902, as well as any storage capacity used as a virtual memory, e.g., as stored on a mass storage device 910.

The hardware 900 also typically receives a number of inputs and outputs for communicating information externally. For interface with a user or operator, the hardware 900 may include one or more user input devices 906 (e.g., a keyboard, a mouse, etc.) and a display 908 (e.g., a Cathode Ray Tube (CRT) monitor, a Liquid Crystal Display (LCD) panel). The user object devices may include capture devices such as a data recorder, a camera, etc.

For additional storage, the hardware 900 may also include one or more mass storage devices 910, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 900 may include an interface with one or more networks 912 (e.g., a local area network (LAN), a wide area network (WAN), a wireless network, and/or the Internet among others) to permit the communication of information with other computers coupled to the networks. It should be appreciated that the hardware 900 typically includes suitable analog and/or digital interfaces between the processor 902 and each of the components 904, 906, 908 and 912 as is well known in the art.

The hardware 900 operates under the control of an operating system 914, and executes various computer software applications 916, components, programs, objects, modules, etc. (e.g. a program or module which performs operations described above). Moreover, various applications, components, programs, objects, etc. may also execute on one or more processors in another computer coupled to the hardware 900 via a network 912, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Computer-readable media may be divided into two separate categories: recordable type media and transmission type media. Recordable type media includes as volatile and non-volatile memory devices, floppy and other removable disks, hard disk drives, optical disks (e.g., Compact Disk Read-Only Memory (CD ROMS), Digital Versatile Disks, (DVDs), etc.), but does not include signals. Transmission type media include signals such as digital and analog communication links.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

What is claimed is:

1. A method performed by a data acquisition device, which is configured to generate at least two different types of data objects, to distinguish between the at least two different types of data objects, and to selectively and automatically transfer only some of the data objects, including a new data object to a user storage device and based upon a determination of data object type, the method comprising:
   detecting that a new data object has been created and stored on the data acquisition device;
   determining a type of the new data object from a plurality of available types, wherein the plurality of available types comprise a sound data object type, a voice data object type, an image data object type, and a video data object type;
   accessing a configuration file which specifies which type of data objects are to be stored locally and which type of data objects are to be stored remotely, and determining that the configuration file specifies that the new data object is of a particular type that should be stored remotely at a user storage device;
   establishing a communication session with an online connection service and communicating with the online connection service to obtain a list of available user storage devices associated with the data acquisition device wherein the list includes a network address for each available user storage device on the list, as well as a communication protocol that the data acquisition device must use to communicate with each available user storage device, and wherein one of the available user storage devices is accessible via a direct point-to-point link whereas the other available user storage devices are accessible via an intermediate proxy server;
   selecting, from the list, an available user storage device on which to store the new data object based on the selected user storage device being accessible via a direct point-to-point link rather than via an intermediate proxy server;
   establishing a communication session with the selected user storage device using the network address corresponding to the selected user storage device via a direct point-to-point link; and
   sending the new data object to the selected user storage device for storage therein.

2. The method of claim 1, further comprising receiving a prioritized list of available user storage devices associated with the data acquisition device from the online connection service.

3. The method of claim 2, further comprising receiving information on the communications protocols supported by each available user storage device on the prioritized list.

4. The method of claim 3, wherein the sending of the new data object is in accordance with the communications protocol supported by the selected user storage device.

5. The method of claim 1, wherein communicating with the online connection service comprises sending authentication information to authenticate the data acquisition device to the online connection service.

6. The method of claim 1, further comprising requesting permission to store the new data object at the selected user storage device before sending the object to the selected user storage device.

7. The method of claim 6, wherein the requesting permission is performed implicitly by sending authentication information to the selected user storage device and receiving an authentication success message from the selected user storage device.

8. The method of claim 1, wherein establishing the communication session with the selected user storage device comprises establishing a peer-to-peer link with the at least one available user storage device.

9. The method of claim 1, wherein establishing the communication session with the selected user storage device comprises establishing a link with the selected user storage device through an intermediate proxy server.

10. A recordable type medium, having stored thereon a sequence of instructions which when executed by a data acquisition device, causes the data acquisition device to perform a method to transfer a new data object to a user storage device, wherein the data acquisition device is configured to generate at least two different types of data objects, to distinguish between the at least two different types of data objects, and to selectively and automatically transfer only some of the data objects, including the new data object to the user storage device and based upon a determination of data object type, and wherein the method performed comprises:
   detecting that a new data object has been created and stored on the data acquisition device;
   determining a type of the new data object from a plurality of available types, wherein the plurality of available types comprise a sound data object type, a voice data object type, an image data object type, and a video data object type;
   accessing a configuration file which specifies which type of data objects are to be stored locally and which type of data objects are to be stored remotely, and determining that the configuration file specifies that the new data object is of a particular type that should be stored remotely at a user storage device;
   establishing a communication session with an online connection service and communicating with the online connection service to obtain a list of available user storage devices associated with the data acquisition device wherein the list includes a network address for each available user storage device on the list, as well as a communication protocol that the data acquisition device must use to communicate with each available user storage device, and wherein one of the available user storage devices is accessible via a direct point-to-point link whereas the other available user storage devices are accessible via an intermediate proxy server, wherein the online connection service creates the list by retrieving presence information from the available user storage devices, the presence information being retrieved using instant message technology,
   selecting, from the list, an available user storage device on which to store the new data object, wherein the selection is based on the selected user storage device being accessible via a direct point-to-point link rather than via an intermediate proxy server;
   establishing a communication session with the selected user storage device using the network address corresponding to the selected user storage device via a direct point-to-point link; and
   sending the new data object to the selected user storage device for storage therein.

11. A data acquisition device, comprising:
   a processor; and a memory coupled to the processor, the memory storing instructions which when executed by the processor, cause the data acquisition device to perform a method for transferring a new data object to a user storage device, wherein the data acquisition device is configured to generate at least two different types of data objects, to distinguish between the at least two different types of data objects, and to selectively and automatically transfer only some of the data objects, including the new data object to the user storage device and based upon a determination of data object type, and wherein the method performed comprises:

detecting that a new data object has been created and stored on the data acquisition device;

determining a type of the new data object from a plurality of available types, wherein the plurality of available types comprise a sound data object type, a voice data object type, an image data object type, and a video data object type;

accessing a configuration file which specifies which type of data objects are to be stored locally and which type of data objects are to be stored remotely, and determining that the configuration file specifies that the new data object is of a particular type that should be stored remotely at a user storage device; establishing a communication session with an online connection service and communicating with the online connection service to obtain a list of available user storage devices associated with the data acquisition device wherein the list includes a network address for each available user storage device on the list, as well as a communication protocol that the data acquisition device must use to communicate with each available user storage device, and wherein one of the available user storage devices is accessible via a direct point-to-point link whereas the other available user storage devices are accessible via an intermediate proxy server;

selecting, from the list, an available user storage device on which to store the new data object based at least in part on the determination of the type of the new data object and based on the selected user storage device being accessible via a direct point-to-point link rather than via an intermediate proxy server;

establishing a communication session with the selected user storage device using the network address corresponding to the selected user storage device via a direct point-to-point link; and sending the new data object to the selected user storage device for storage therein.

12. The method of claim 1, wherein the configuration file included on the data acquisition device is input by a user.

13. The method of claim 1, wherein the online connection service stores active presence information about the available user storage devices associated with the data acquisition device.

14. The method of claim 1, wherein establishing a communications session with the selected user storage device comprises a communications session which is separate and distinct from the communications session with the online connection service.

15. The method of claim 1, wherein image data objects are of the particular type configured for automatic transfer, while voice data objects are not, such that image data objects are selected for automatic transfer while voice data objects are refrained from being selected for automatic transfer.

16. The method of claim 1, wherein the selected user storage device is one of a user's personal desktop computer, or a user's personal notebook computer.

* * * * *

UNITED STATES PATENT AND TRADEMARK OFFICE
CERTIFICATE OF CORRECTION

| | | |
|---|---|---|
| PATENT NO. | : 7,779,130 B1 | Page 1 of 1 |
| APPLICATION NO. | : 10/817599 | |
| DATED | : August 17, 2010 | |
| INVENTOR(S) | : Michael Joseph Toutonghi | |

It is certified that error appears in the above-identified patent and that said Letters Patent is hereby corrected as shown below:

In column 6, line 59, delete "includes as" and insert -- include --, therefor.

Signed and Sealed this

Fifteenth Day of February, 2011

David J. Kappos
*Director of the United States Patent and Trademark Office*